Sept. 16, 1952     M. C. MAGARIAN     2,610,603
SIGNAL ARM
Filed July 25, 1950
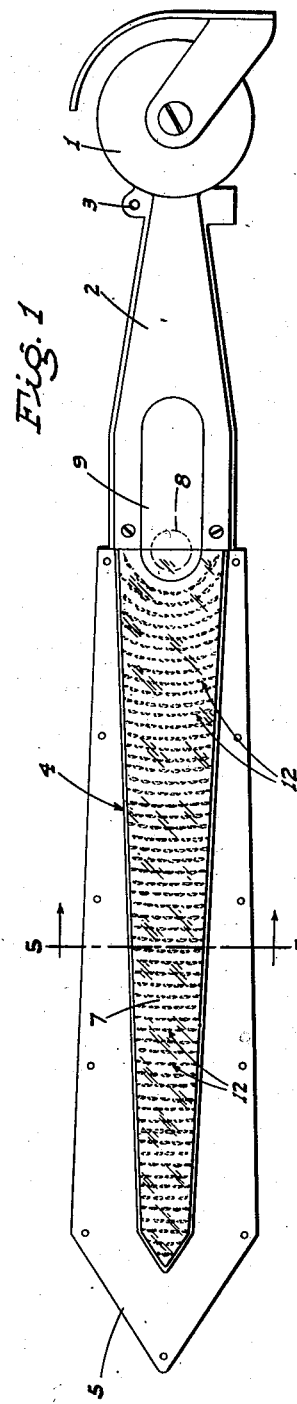
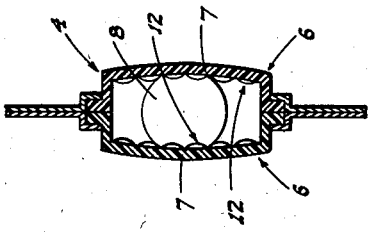
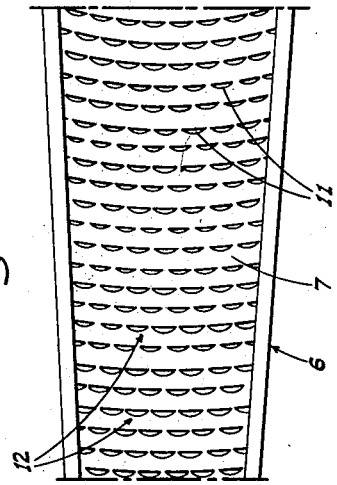
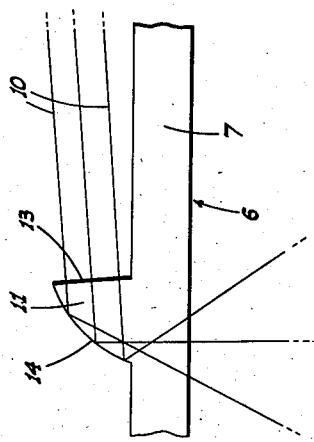
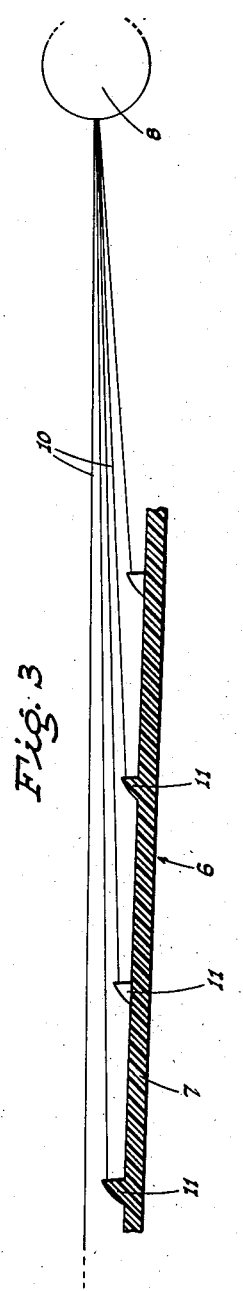
Inventor
Masick C. Magarian
By
ATTORNEYS Patented Sept. 16, 1952

2,610,603

UNITED STATES PATENT OFFICE 2,610,603

SIGNAL ARM

Masick C. Magarian, Fresno, Calif.

Application July 25, 1950, Serial No. 175,821

2 Claims. (Cl. 116—48)

1

This invention is directed to, and it is an object to provide, an improved semaphore type signal for trucks, or the like, to indicate the driver's intention to turn or stop.

Another object of the invention is to provide a semaphore type signal, as above, which includes a novel, illuminated signal arm; such arm being tubular, of light transmitting material, and on opposite sides being formed with a multiplicity of laterally inwardly projecting nubs shaped as prisms whereby to reflect the light, from a globe at the inner end of the arm, laterally outwardly therethrough for its full length. The signal arm is thus effectively illuminated for use at night.

A further object of the invention is to provide said prisms in a novel form and arrangement which produces maximum and even illumination of the signal arm for its full length, and assures of relatively high intensity reflection of light laterally outwardly from the arm; the form of the prisms being such that the signal arm, when illuminated, is highly visible in all operative positions, and from different angles from the front or rear of the vehicle.

An additional object of the invention is to provide a signal arm, as aforesaid, wherein the nubs which form the prisms are integral with the corresponding side of said arm; the latter preferably being molded of plastic.

It is also an object of the invention to provide a signal arm which is designed for ease and economy of manufacture.

Still another object of the invention is to provide a practical and reliable signal arm, and yet one which will be exceedingly effective for the purpose for which it is designed.

These objects are accomplishd by means of such structure and relative arrangement of parts as will fully appear by a perusal of the following specification and claims.

In the drawings:

Fig. 1 is a side elevation of a semaphore-type vehicle signal embodying the present invention.

Fig. 2 is an enlarged fragmentary diagrammatic plan view showing one of the prism forming nubs as projecting laterally inwardly from the corresponding side wall of the signal arm.

Fig. 3 is an enlarged fragmentary sectional plan of one side wall of the signal arm showing a plurality of the laterally inwardly projecting, prism forming nubs.

Fig. 4 is an enlarged fragmentary inner face elevation of one of the side walls of the signal arm, showing the arrangement of the prism forming nubs thereon.

2

Fig. 5 is a cross section on line 5—5 of Fig. 1.

Referring now more particularly to the characters of reference on the drawings, the signal is of a generally known semaphore type, including a rotary mount 1 adapted for attachment to a vehicle, and having a vertically swingable semaphore arm 2 projecting therefrom and adapted to be disposed in selective positions of adjustment to indicate the intended turn or stop; the semaphore arm 2 being actuated by a cord (not shown) which attaches to an eye 3.

A tubular signal arm 4 is fixed in connection with, and projects lengthwise from, the outer end of the semaphore arm 2, being supported top and bottom by a metallic pointer 5 which is likewise secured to, and projects from, said semaphore arm 2.

The tubular signal arm 4 is of colored, light transmitting material, suitably amber in color, and preferably of plastic.

The tubular signal arm 4 is comprised of two longitudinal half sections of channel form, each such section being indicated generally at 6.

Each longitudinal half section 6 of the signal arm 4 includes a substantially flat side wall 7; said side walls facing to the front and rear, respectively, and lengthwise converging slightly in an outward direction.

The tubular signal arm 4 is illuminated from within by an electric globe 8 disposed in a globe housing 9 at the outer end of the semaphore arm 2. The flat, longitudinal side walls 7 thus converge outwardly with respect to the longitudinal center line 10 of light projection lengthwise in the signal arm 4 from said globe 8.

In order to assure of even and full illumination of the signal arm 4 from end to end thereof, and further to produce effective or high intensity light reflection laterally outwardly through the side walls 7 of the signal arm, each side wall has a multiplicity of novel, prism forming nubs 11 projecting laterally inwardly therefrom.

As the nub arrangement on each side wall 7 is the same, a description of such arrangement with respect to one of said walls will suffice.

The nubs 11 on each side wall 7 are integral therewith and project laterally inwardly therefrom in rows 12 which are concentric to the globe 8; the rows 12 being spaced substantially equi-distantly for the full length of the signal arm 4. The prism forming nubs 11 of adjacent rows 12 are staggered, as clearly shown in Fig. 4, and the nubs increase in height from the innermost to the outermost of the rows 12; i. e. the nubs of each successive row in an outward direction are somewhat higher than the nubs of the next innermost row.

Each nub 11 has a flat front face 13, and to dispose all of said faces 13 in right angle facing relation to the globe 8, the prism forming nubs 11 are not only arranged in the rows 12 concentric to said globes, but additionally each such face 13 is canted, as clearly shown in Fig. 2.

The rear face 14 of each prism forming nub 11 is convexly arcuate in vertical and horizontal planes.

When the signal is in use at night, with the tubular signal arm 4 illuminated internally by the globe 8, the above described arrangement of the nubs 11 functions as follows, on each of the side walls 7, to produce an even illumination throughout the length of said signal arm 4, and to create a high intensity reflection of the light laterally outwardly through said side wall also for its full length.

The light rays from the globe 8 project lengthwise in an outward direction in the signal arm 4, striking the flat front faces 13 of the prism forming nubs 11 in each row 12, as shown in Fig. 3; each row of nubs being assured of direct light ray reception by reason of the fact that the side walls 7 converge in an outward direction, and further by reason of the fact that the nubs 11 are of progressively greater height in the rows from the inner end toward the outer end of the signal arm.

As the flat front faces 13 of the nubs 11 are in right angle facing relation to the globe 8, a plurality of rays, as indicated diagrammatically in Fig. 2, enter each prism forming nub 11 through the face 13, strike the convexly arcuate rear face 14, and thence reflect laterally outwardly through the corresponding side wall 7 in multiple directions. This results in high intensity illumination of each side wall 7 for its full length, which illumination is visible to the driver of another vehicle, irrespective of the adjusted position of the signal.

The prism forming nubs 11 thus catch and reflect the light laterally through the side walls in an improved or more highly efficient manner; the design of the nubs being such that the reflected light is greatly spread, as is desirable; and a uniform distribution of light throughout the length of the signal arm 4 is attained.

The described signal arm thus provides a very practical and reliable signaling device, and one which, by reason of its high visibility, makes for safety.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a signal which includes a tubular signal arm of light transmitting material having a substantially vertical side wall, and an electric globe mounted to project light into the arm from one end thereof; a multiplicity of prism forming light catching and deflecting nubs projecting laterally in from said side wall in rows spaced lengthwise of the wall and extending transversely thereof and disposed to catch and deflect light from the globe laterally out through the side wall in a substantially horizontal direction; each row of nubs being disposed in a circular line concentric to the axis of the globe.

2. In a signal which includes an elongated tubular signal arm of light transmitting material having a substantially vertical side wall, and an electric globe mounted to project light into the arm lengthwise from one end thereof; a multiplicity of nubs on and projecting laterally inward from said side wall and forming prisms operative to deflect light projected in the arm from the globe, laterally out through the side wall; the prisms being in rows extending transversely of said side wall and spaced lengthwise thereof; the prisms of the successive rows outwardly relative to the globe having progressively greater laterally inward projection.

MASICK C. MAGARIAN.

REFERENCES CITED

The following references are of record in the file of this patent:

UNITED STATES PATENTS

| Number | Name | Date |
|---|---|---|
| 720,386 | Wadsworth | Feb. 10, 1903 |
| 1,583,119 | Brenkert | May 4, 1926 |
| 1,645,454 | Santiago | Oct. 11, 1927 |
| 1,961,492 | Heckendorf | June 5, 1934 |
| 2,153,634 | Magarian | Apr. 11, 1939 |